March 10, 1964 H. SCRUTTON 3,123,979
BILGE BLOCKS AND DRY DOCKS UTILISING SUCH BILGE BLOCKS
Filed May 8, 1961 9 Sheets-Sheet 3
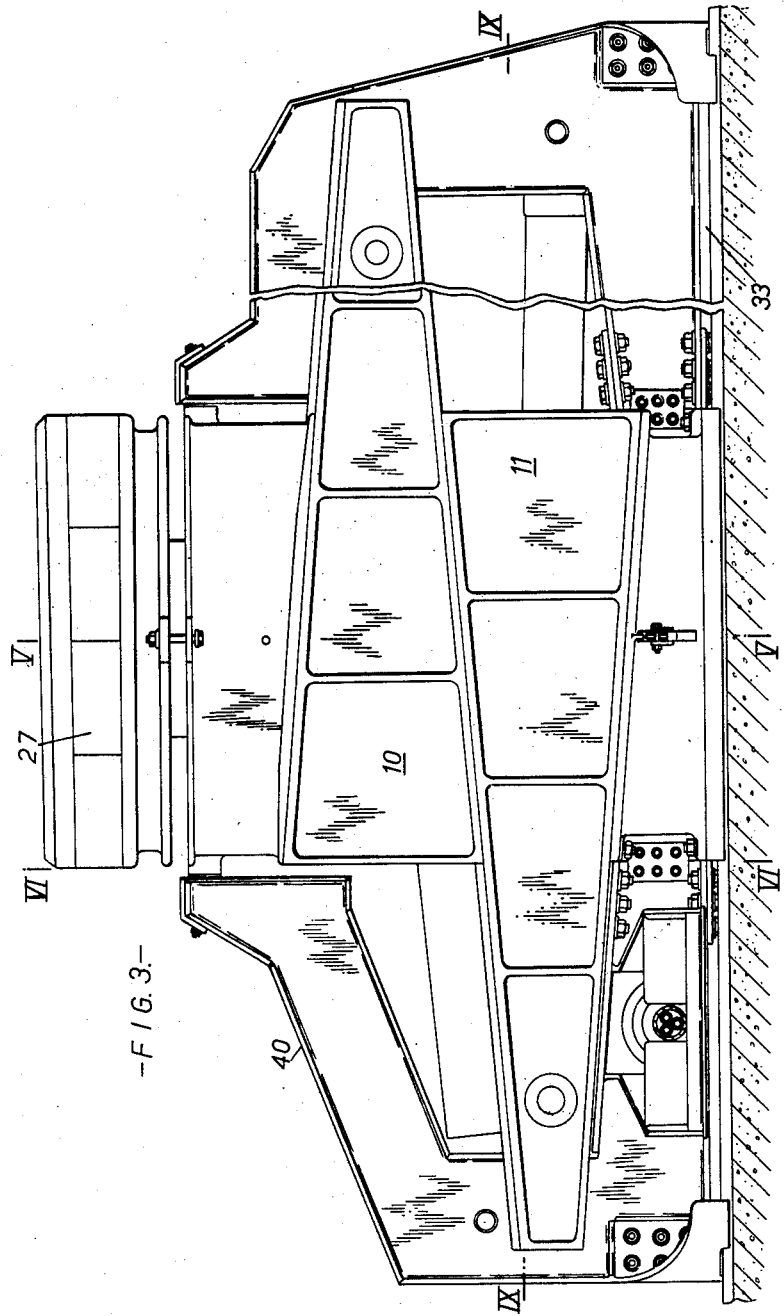
INVENTOR:
HAROLD SCRUTTON
BY March 10, 1964 H. SCRUTTON 3,123,979
BILGE BLOCKS AND DRY DOCKS UTILISING SUCH BILGE BLOCKS
Filed May 8, 1961 9 Sheets-Sheet 4
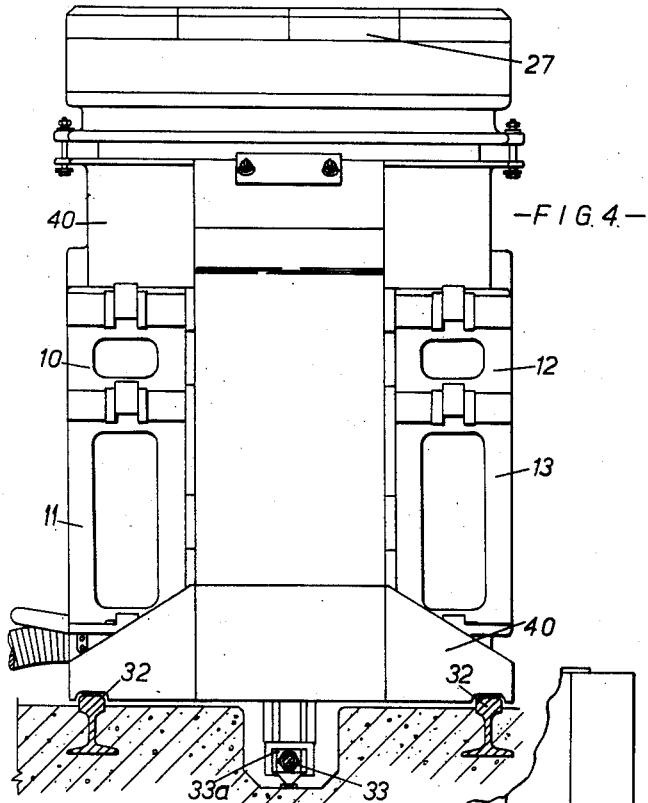
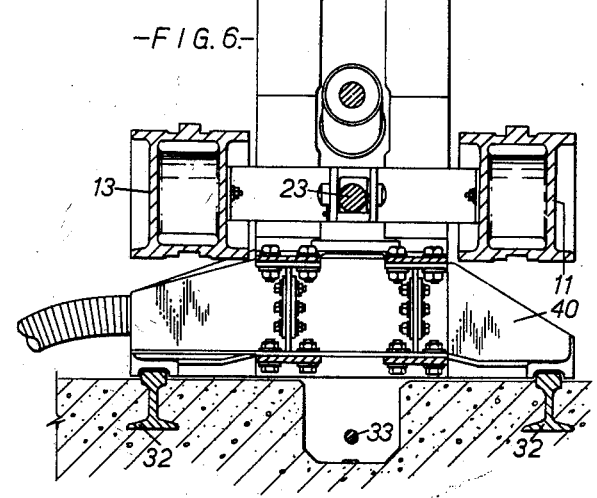
INVENTOR:
HAROLD SCRUTTON March 10, 1964 H. SCRUTTON 3,123,979
BILGE BLOCKS AND DRY DOCKS UTILISING SUCH BILGE BLOCKS
Filed May 8, 1961 9 Sheets-Sheet 5
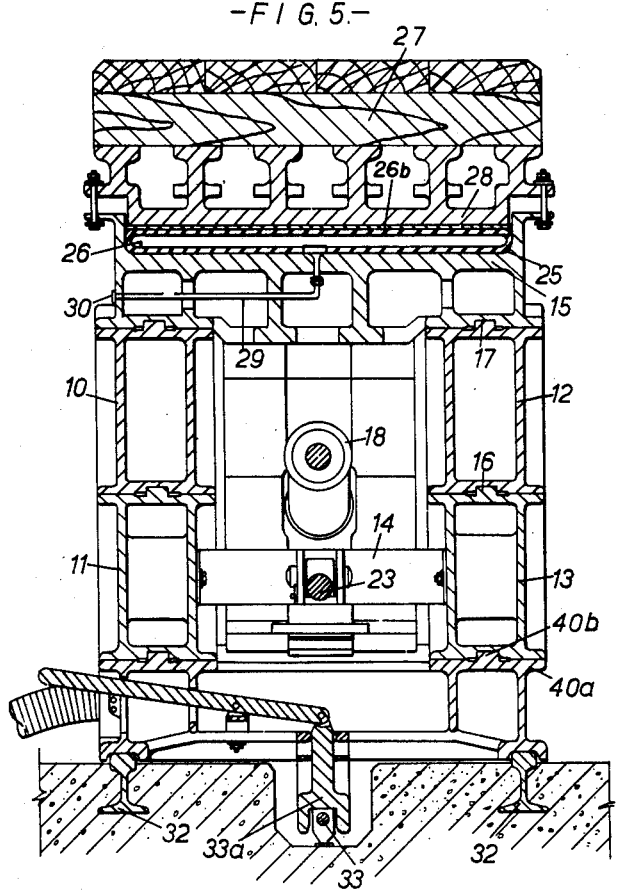
INVENTOR:
HAROLD SCRUTTON
BY
Attys.

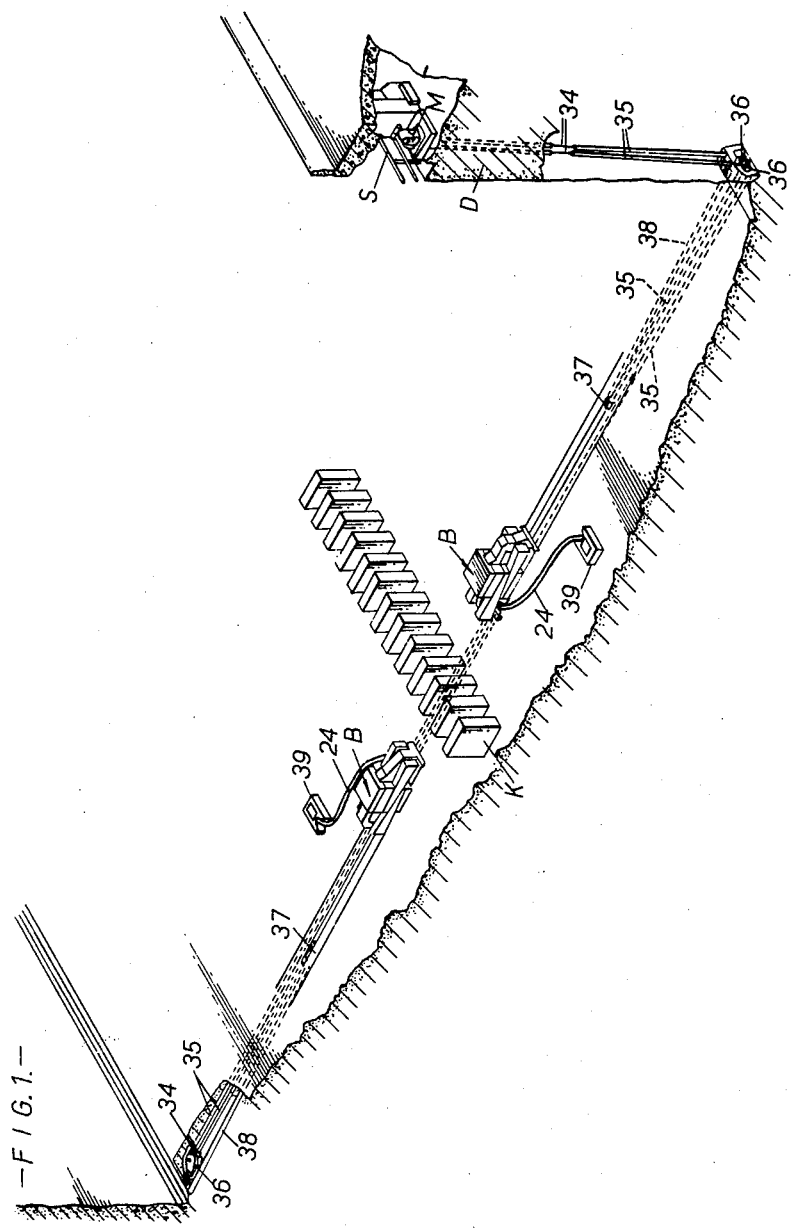

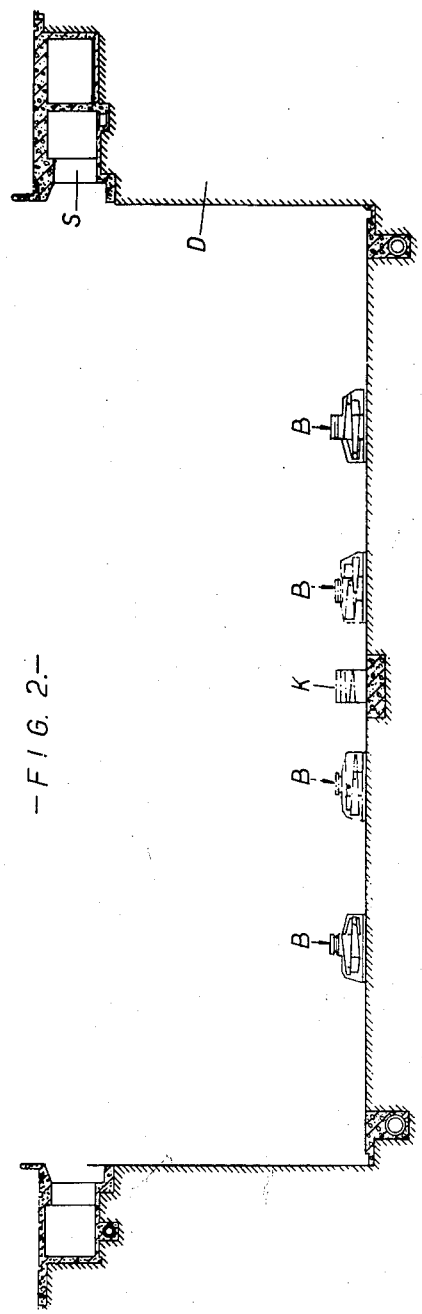

March 10, 1964 H. SCRUTTON 3,123,979
BILGE BLOCKS AND DRY DOCKS UTILISING SUCH BILGE BLOCKS
Filed May 8, 1961 9 Sheets-Sheet 6
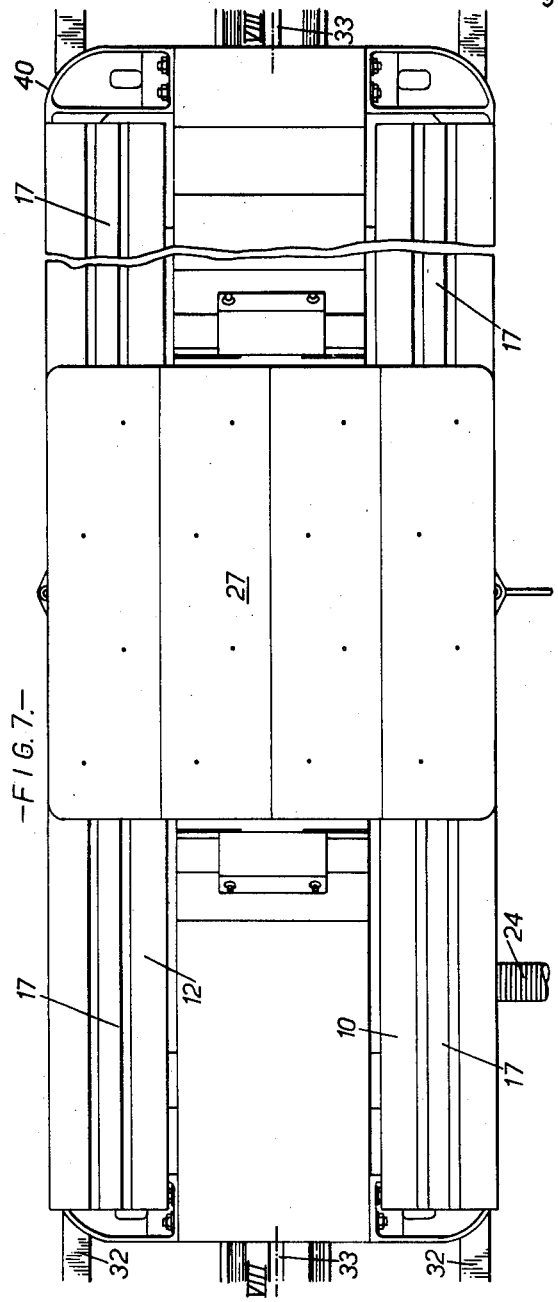
INVENTOR:
HAROLD SCRUTTON
BY

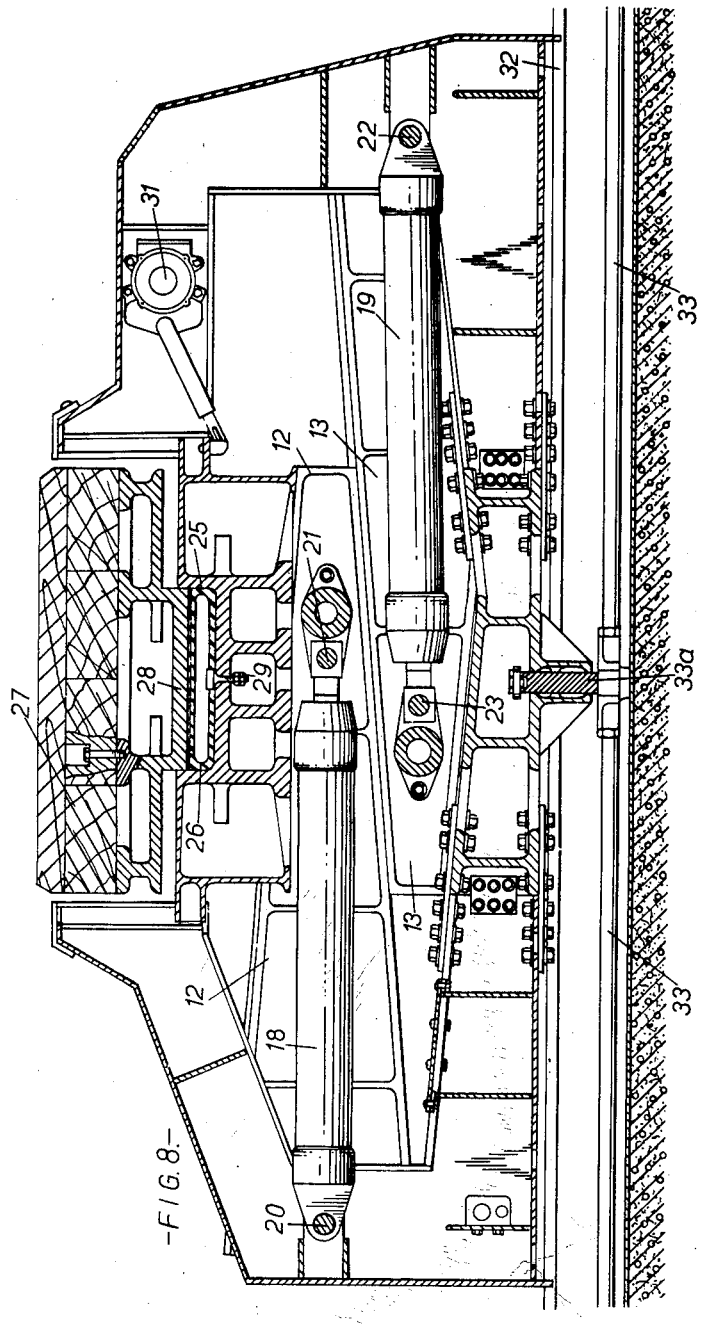

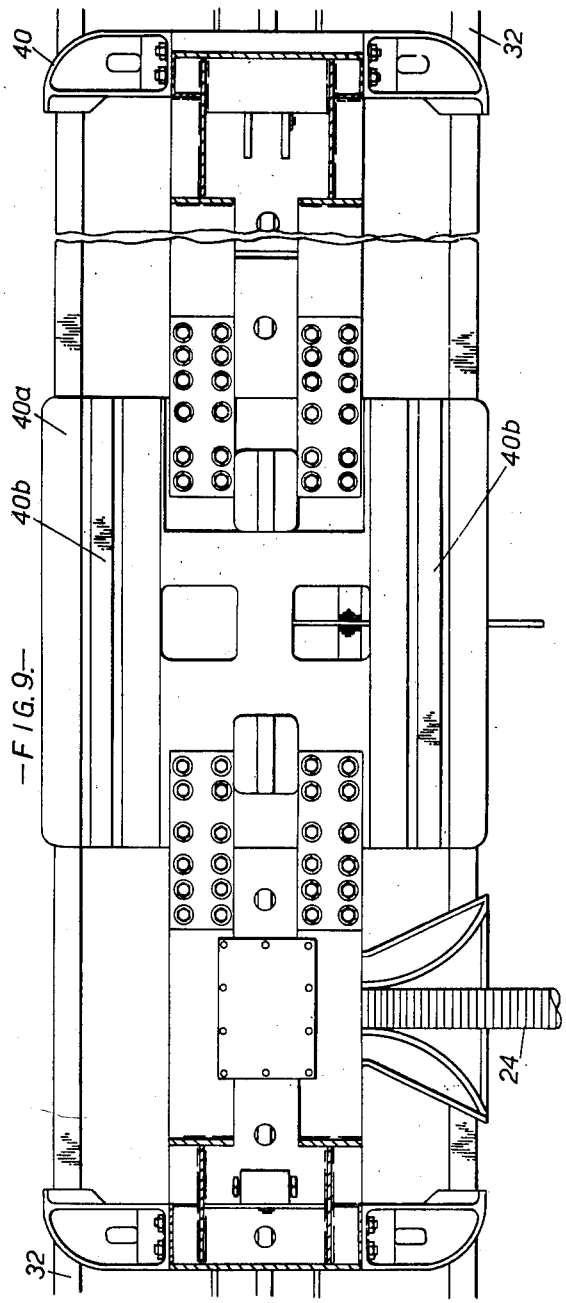

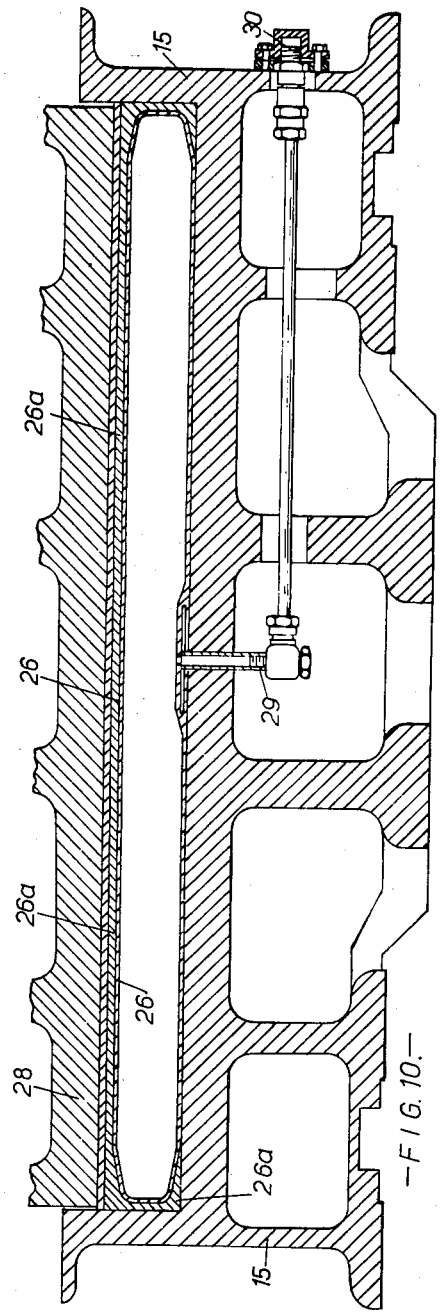

United States Patent Office 3,123,979
Patented Mar. 10, 1964

3,123,979
BILGE BLOCKS AND DRY DOCKS UTILISING SUCH BILGE BLOCKS
Harold Scrutton, London, England, assignor to Cammell Laird & Company (Shipbuilders & Engineers) Limited, Birkenhead, England, a British company
Filed May 8, 1961, Ser. No. 108,385
Claims priority, application Great Britain May 13, 1960
7 Claims. (Cl. 61—66)

This invention is for improvements in or relating to bilge blocks or the like and dry or graving docks utilising such bilge blocks.

Bilge blocks are positioned on opposite sides of the keel blocks along the length of the dock bottom and serve, as an alternative to the previously more commonly used timber props, to support a vessel in an upright position after the dock has been emptied.

One object of the present invention is to provide a bilge block which, while it will give sound and solid support to a vessel, can relatively easily be released when it is required to remove it or adjust its position, as may be necessary in order to gain access to some particular part of the ship's bottom.

The setting and maneuvering of bilge blocks as constructed heretofore has been a laborious procedure requiring considerable manual labor. A further object of the invention is to provide a bildge block which is power operated and, if desired, can be maneuvered and adjusted, while under water, from a remote station, for example on the upper part of the dock wall.

According to the present invention there is provided a bildge block or the like having a wedge device or devices for adjusting it in height and in which the load of a ship on the block is taken by a cushion of fluid (e.g. water), means being provided for discharging or bleeding-off a quantity of said fluid when it is required to relieve the wedge device or devices of the load, so that they can be adjusted to permit the block to be withdrawn.

Preferably the wedge angle is well below the maximum angle of friction for the surfaces in contact so that the block constitutes a stable and rigid support for the vessel, it being virtually impossible for the wedges to slip out of place or become dislodged accidentally. This, however, introduces a problem should it be required to remove or reposition the blocks.

The present invention solves this problem by providing the above mentioned cushion of fluid. By releasing fluid from this cushion, the load on the wedges of the block it is required to move is eased and the wedges can easily be moved to the released position.

In a preferred embodiment of the invention the wedges are actuated by pressure fluid rams, e.g. double acting hydraulic rams.

The fluid cushion may be embodied in the upper part of the block immediately under a movable head which is supported by said cushion.

Preferably the fluid pad or cushion is contained in an elastic (e.g. rubber) envelope, said envelope being in turn protected by a hard elastic shield forming the walls and upper surface of the cushion.

According to a further feature of the invention there is provided a dry dock having a plurality of pairs of bilge blocks as above described spaced apart longitudinally of the dock, the blocks of each pair being coupled together by a common adjusting mechanism for adjustment in unison transversely of the dock. This adjusting mechanism may comprise chain or rod and chain transmission gearing, adapted to be driven and controlled from a motor and control station located on the upper part of the dock wall. The arrangement may be such that the blocks can be disconnected one from the other so that one or both of them can be traversed independently.

Control of the pressure fluid to and from the rams operating the wedges may be from the same or a similar remote station.

A telegraph may be associated with the bilge blocks so as to provide an indication of the height of the block at the remote control station. Similarly, means may be provided at the control station for indicating the positions of the various pairs of blocks laterally with respect to the dock.

The pairs of blocks may be guided in their transverse or lateral movement over the dock floor by mounting them on rails or guides.

The invention will be further described, by way of example, with reference to the accompanying drawings wherein:

FIGURE 1 is a diagrammatic perspective view showing a pair of the adjustable bilge blocks in position in a dock and the operating means for said bilge blocks, FIGURE 2 shows diagrammatically a typical cross-section through a dock having adjustable bilge blocks according to the invention, FIGURE 3 is a side elevation of one of the bilge blocks, FIGURE 4 is an end elevation of the bilge block shown in FIGURE 3, FIGURE 5 is a section on the line V—V of FIGURE 3, FIGURE 6 is a section on the line VI—VI of FIGURE 3, FIGURE 7 is a plan view of the bilge block shown in FIGURE 3, FIGURE 8 is a section on the line VIII—VIII of FIGURE 7, FIGURE 9 is a plan view on the line IX—IX of FIGURE 3, with the rams and wedges removed, and FIGURE 10 is a sectional view showing in detail the construction of the fluid (e.g. water) cushion.

Referring to the drawings, each bilge block B comprises a body part 40 having, on either side of it, oppositely disposed overlapping wedges 10, 11 and 12, 13. The lower pair of wedges 11, 13 are rigidly tied together to form a single unit by tie bars 14 as shown more particularly in FIGURE 5. The upper pair of wedges 10, 12 are similarly tied together.

The lower wedges 11 and 13 are slidable on the base 40a of the body part 40 and are guided in such movement and retained in position on the base 40a by slide and slideway devices 40b. Similar slide and slideway devices are provided between the wedges 10, 11 and 12, 13 and between the wedges 10 and 12 and the headpiece 15, of the bilge block, as indicated at 16 and 17.

Relative movement of the upper and lower wedge units 10, 12 and 11, 13 is effected by double acting rams 18 and 19 respectively. The ram 18 is coupled to the bilge block body 40 as indicated at 20 and to the upper wedge unit 10, 12 as indicated at 21. Similarly the ram 19 is coupled to the bilge block body at 22 and to the lower wedge unit 11, 13 at 23.

The supply of pressure fluid to the rams 18 and 19 is by way of a flexible hose 24 connected to a hydraulic pressure main in the dock floor. The rams will be provided with appropriate control valves to ensure synchronized operation on the outward stroke and to stop, start and reverse.

The headpiece 15 of the bilge block has a cylinder-like part or cavity 25 which houses a rubber or other flexible envelope or bladder 26 protected by a hard elastic shield 26a which carries a stainless steel bearing plate 26b. The cap 27 of the bilge block has a piston-like part 28 which is a sliding fit in the upper part of the cavity 25 and rests on the shield 26a. The envelope 26 is filled with water or other liquid so that in effect the cap 27 is supported on a cushion of water. A pipe 29 fitted with a plug or tap and non-return valve at 30 provides for liquid being discharged from the envelope 26 when it is desired to lower the cap 27 so as to relieve a block of its load prior to lowering it. Lowering is, of course, effected by drawing the wedge units outwardly by means of the rams 18 and 19. Movement of the wedge devices in the opposite direction increases the height of the block.

Vertical movement of the headpiece 15 of the block which carries the cap 27 actuates a telegraph transmitter 31, of known kind, which transmits an indication of this movement to a remotely located control station.

The blocks are adjustable transversely of the dock on rails 32.

Although FIGURE 1 shows only one pair of bilge blocks B there will, of course, be a plurality of pairs spaced apart along the row of keel blocks K. Simultaneous adjustment of the bilge block of each pair is effected by a motor M provided at the control station S in the dock wall D. The motor is operatively connected to the bilge blocks by rod and chain mechanism 33, 34, the rods being connected to the blocks at 33a and the chain running through pipes 35 and over guide wheels 36. The arrangement is such as to ensure that the bilge blocks in each pair move together and remain equally distant from the centre line. Means may be provided at 33a whereby the blocks can be disconnected one from the other so that they can be adjusted independently and shear pins may be provided in the driving wheel to protect the mechanism against accidental overload. When at rest the blocks are automatically locked in any position of adjustment by gearing at the control position S.

A limit switch is provided at the control station S to stop the bilge blocks at the extreme inner positions and at the extreme outer positions 37.

Drain pipes 38 are provided which are arranged to carry away surface water trapped in the trenches in the dock floor.

It will be appreciated from the above description that the present invention provides bilge blocks capable of being mechanically operated to fit the ship by means of folded or overlapping wedges, the load of the ship being carried on cushions of fluid which not only afford the advantage previously described, but also allow the tops or caps of the blocks to take up the alignment or contour of the bottom of the ship.

It will also be appreciated that the blocks can be maneuvered into position and adjusted while still under water.

Means may be provided for determining the load on the block from the pressure in the cushion of fluid, e.g. by means of a pressure gauge. The actual pressure indicator may be located at the remote control station.

As an alternative to the wedges screw jacks or some other arrangement could be used for adjusting the height of the bilge blocks.

Dock floor junction boxes 39 are provided where flexible hydraulic pipes and telegraph cable join rigid piping in the floor.

I claim:
1. A bilge block comprising a body part, a wedge assembly including oppositely disposed overlapping wedge devices slidably supported in said body part and having wedge angles well below the maximum angle of friction for the surfaces in contact so that the load alone on the bilge block will not cause relative sliding movement between said surfaces and cause the block to collapse, means for effecting relative movement between said wedge devices so as to increase or decrease the height of the wedge assembly, a bilge block head-piece supported on said wedge assembly for vertical adjustment thereby on and relatively to the body part thereby to adjust the height of the bilge block, said head-piece having a cavity in its upper part, a bilge block cap having a piston-like part slidably located for vertical movement in said cavity, a cushion of fluid in said cavity below said bilge block cap and means for leaking-off fluid from said cushion thereby to relieve the load on the bilge block and permit said relative movement between the wedge devices for height adjustment of the bilge block.

2. A bilge block comprising a body part, a wedge assembly including oppositely disposed overlapping wedge devices slidably supported in said body part and having wedge angles well below the maximum angle of friction for the surfaces in contact so that the load alone on the bilge block will not cause relative sliding movement between said surfaces and cause the block to collapse, means for effecting relative movement between said wedge devices so as to increase or decrease the height of the wedge assembly, a bilge block head-piece supported on said wedge assembly for vertical adjustment thereby on and relatively to the body part thereby to adjust the height of the bilge block, said head-piece having a cavity in its upper part, a bilge block cap having a piston-like part slidably located for vertical movement in said cavity, a fluid-filled elastic envelope in said cavity below said bilge block cap and on which said cap rests and means for leaking-off fluid from said envelope thereby to relieve the load on the bilge block and permit said relative movement between the wedge devices for height adjustment of the bilge block.

3. A bilge block comprising a body part, a wedge assembly including oppositely disposed overlapping wedge devices slidably supported in said body part and having wedge angles well below the maximum angle of friction for the surfaces in contact so that the load alone on the bilge block will not cause relative sliding movement between said surfaces and cause the block to collapse, pressure fluid ram means for effecting relative movement between said wedge devices so as to increase or decrease the height of the wedge assembly, a bilge block head-piece supported on said wedge assembly for vertical adjustment thereby on and relatively to the body part thereby to adjust the height of the bilge block, said head-piece having a cavity in its upper part, a bilge block cap having a piston-like part slidably located for vertical movement in said cavity, a cushion of fluid in said cavity below said bilge block cap and means for leaking-off fluid from said cushion thereby to relieve the load on the bilge block and permit said relative movement between the wedge devices for height adjustment of the bilge block.

4. A bilge block comprising a body part, a wedge assembly including oppositely disposed overlapping wedge devices slidably supported in said body part and having wedge angles well below the maximum angle of friction for the surfaces in contact so that the load alone on the bilge block will not cause relative sliding movement between said surfaces and cause the block to collapse, means for effecting relative movement between said wedge devices so as to increase or decrease the height of the wedge assembly, a bilge block head-piece supported on said wedge assembly for vertical adjustment thereby on and relatively to the body part thereby to adjust the height of the bilge block, said head-piece having a cavity in its upper part, a bilge block cap having a piston-like part slidably located for vertical movement in said cavity, a cushion of fluid in said cavity below said bilge block cap, means for leaking-off fluid from said cushion thereby to relieve the load on the bilge block and permit said relative movement between the wedge devices for height adjustment of the bilge block, a telegraph transmitter, means operatively connecting said telegraph transmitter to the bilge block head-piece, a remotely located receiver and a transmitting system between said transmitter and said receiver whereby said vertical adjustments of the bilge block head-piece are indicated at the remotely located receiver.

5. A bilge block comprising a body part, a wedge assembly including oppositely disposed overlapping wedge devices slidably supported in said body part and having wedge angles well below the maximum angle of friction for the surfaces in contact so that the load alone on the bilge block will not cause relative sliding movement between said surfaces and cause the block to collapse, pressure fluid ram means for effecting relative movement between said wedge devices so as to increase or decrease the height of the wedge assembly, a bilge block head-piece supported on said wedge assembly for vertical adjustment thereby on and relatively to the body part thereby to adjust the height of the bilge block, said head-piece having a cavity in its upper part, a bilge block cap having a piston-like part slidably located for vertical movement in said cavity, a fluid-filled elastic envelope in said cavity below said bilge block cap, said envelope including a hard elastic shield which forms its upper part and on which said cap rests, and means for leaking-off fluid from said envelope thereby to relieve the load on the bilge block and permit said relative movement between the wedge devices for height adjustment of the bilge block.

6. A dock having a plurality of pairs of bilge blocks spaced apart longitudinally of the dock and each comprising a body part, a wedge assembly including oppositely disposed overlapping wedge devices slidably supported in said body part and having wedge angles well below the maximum angle of friction for the surfaces in contact so that the load alone on the bilge block will not cause relative sliding movement between said surfaces and cause the block to collapse, means for effecting relative movement between said wedge devices so as to increase or decrease the height of the wedge assembly, a bilge block head-piece supported on said wedge assembly for vertical adjustment thereby on and relatively to the body part thereby to adjust the height of the bilge block, said head-piece having a cavity in its upper part, a bilge block cap having a piston-like part slidably located for vertical movement in said cavity, a cushion of fluid in said cavity below said bilge block cap and means for leaking-off fluid from said cushion thereby to relieve the load on the bilge block and permit said relative movement between the wedge devices for height adjustment of the bilge block, and an adjusting mechanism coupling the blocks of each pair together for adjustment in unison, transversely of the dock, so that they remain equally distant from the centre line.

7. A dock having a plurality of pairs of bilge blocks spaced apart longitudinally of the dock and each comprising a body part, a wedge assembly including oppositely disposed overlapping wedge devices slidably supported in said body part and having wedge angles well below the maximum angle of friction for the surfaces in contact so that the load alone on the bilge block will not cause relative sliding movement between said surfaces and cause the block to collapse, means for effecting relative movement between said wedge devices so as to increase or decrease the height of the wedge assembly, a bilge block head-piece supported on said wedge assembly for vertical adjustment thereby on and relatively to the body part thereby to adjust the height of the bilge block, said head-piece having a cavity in its upper part, a bilge block cap having a piston-like part slidably located for vertical movement in said cavity, a cushion of fluid in said cavity below said bilge block cap, and means for leaking-off fluid from said cushion thereby to relieve the load on the bilge block and permit said relative movement between the wedge devices for height adjustment of the bilge block, and power operated means for adjusting the blocks of each pair in unison transversely of the dock and detachable coupling means between the blocks and said power-operated adjusting means whereby the blocks can be adjusted independently.

References Cited in the file of this patent

UNITED STATES PATENTS

| 73,376 | Parlour | Jan. 14, 1868 |
| 2,870,639 | Suderow | Jan. 27, 1959 |

FOREIGN PATENTS

| 319,907 | Great Britain | Oct. 3, 1929 |
| 395,102 | Great Britain | July 13, 1933 |

OTHER REFERENCES

German publication, 1,027,615, Apr. 10, 1958.